July 18, 1967 — B. M. GRANT — 3,331,196
HARVESTING ATTACHMENT
Filed April 20, 1964 — 3 Sheets-Sheet 1

INVENTOR.
BENJAMIN M. GRANT
BY Browne, Schuyler & Beveridge.
ATTORNEYS

INVENTOR.
BENJAMIN M. GRANT

July 18, 1967
B. M. GRANT
3,331,196
HARVESTING ATTACHMENT
Filed April 20, 1964
3 Sheets-Sheet 3
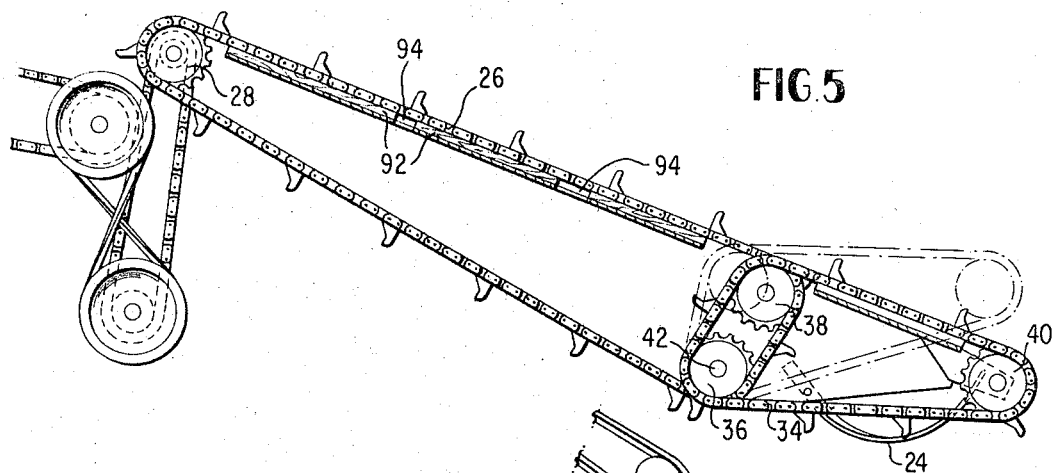
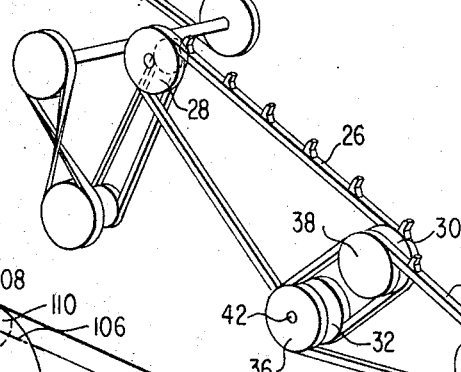
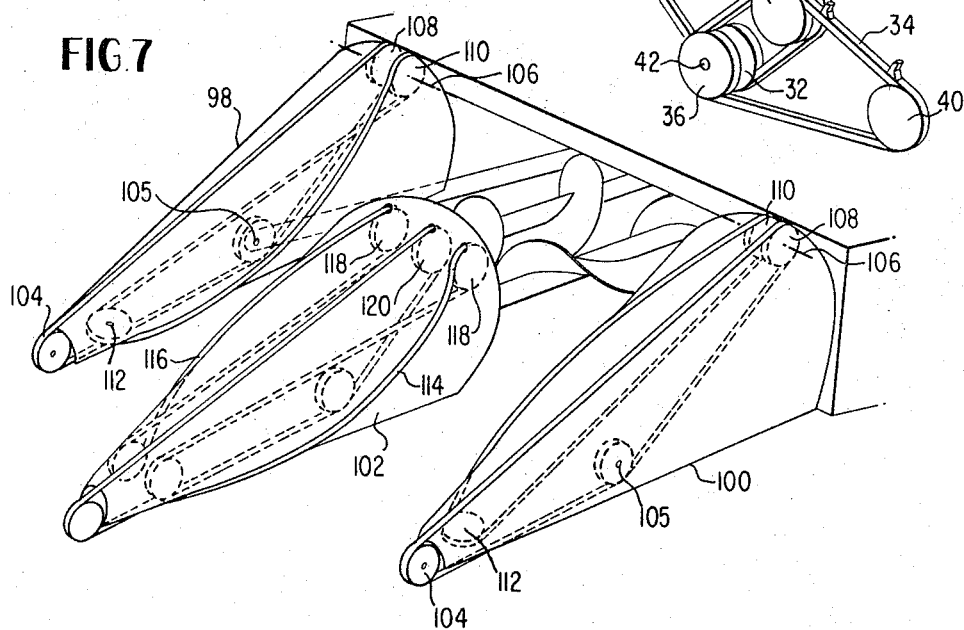
INVENTOR.
BENJAMIN M. GRANT
BY
Browne, Schuyler & Beveridge
ATTORNEYS

United States Patent Office 3,331,196
Patented July 18, 1967

3,331,196
HARVESTING ATTACHMENT
Benjamin M. Grant, Rte. 1, Box 43,
Pasco, Wash. 99301
Filed Apr. 20, 1964, Ser. No. 361,119
9 Claims. (Cl. 56—106)

This invention relates generally to harvesting equipment and more particularly to an improved crop gathering attachment for such equipment.

In the past harvesting equipment has been used to pick corn by removing the ears from the standing stalks and leaving the foliage in the field. However, if standing corn is subjected to adverse conditions such as high winds, lodging or driving rain, it is not uncommon for all or a substantial portion of the crop to be destroyed when the broken stalks become entangled on the ground. Under such conditions conventional corn pickers can only operate, at best, at marginal efficiency. The inability to handle a "downed" crop is principally due to the design of the conventional gathering unit which is constructed primarily to harvest corn from standing stalks. Conventional gathering chains are so mounted on the dividers of a conventional corn head that some of the ears on "downed" stalks are allowed to pass beneath the snouts and thus beneath the snapping rolls, even though the base portion of the stalk may be drawn into the snapping roll. Such a condition often results in plugging the snapping rolls because under such circumstances the stalk is presented to the snapping roll by sliding along the base of the divider without being conveyed into the snapping roll. Thus, the stalk is initially misaligned, and this misalignment is not corrected prior to the introduction of that portion of the stalk into the snapping roll. Obviously, there is a significant reduction in crop production when such equipment is used on a damaged crop containing a high percentage of "downed" corn.

It has been found that during the harvesting of "downed" corn it is desirable to lift the "downed" stalks to the standing position by elevating their free ends; that is, the end of the stalk which would normally constitute the top of standing corn. By engaging the "downed" stalks near their free ends and elevating these ends the overall resistance to elevation due to the weight of the attached ear and the body of the stalk itself is considerably reduced; and thus, as the stalk is raised toward the standing position, there is a reduced tendency of the stalk to whip upright, and thus a similarly reduced tendency for the ear to be torn from the stalk and thrown clear of the picker. The gradual elevation of the stalk and its presentation to the snapping roll in a substantially standing position will insure that the snapping roll can function to strip or "snap" the ears from the stalk as intended. In addition, considerable strain on the equipment is eliminated, and thus the operational life of the moving parts of the picker is increased and its efficiency of operation materially improved.

Accordingly, it is an object of the present invention to provide an improved harvesting attachment for gathering and conveying "downed" corn in a position to facilitate stripping or "snapping" of the ears from the damaged stalk by presenting the stalk to the snapping rolls in a standing position.

It is an object of this invention to provide an improved gathering attachment for harvesting "downed" crops with a degree of speed and efficiency heretofore unattainable by any conventional unit.

It is another object of this invention to facilitate the movement of harvesting equipment through a field of "downed" corn without the attendant plugging, bridging or lodging of tangled or broken stalks in the gathering head which occurs with conventional units.

A further object of the present invention resides in providing a corn head with an improved system of transfer chains extending from the forwardmost portion of the unit rearwardly forraising and conveying the "downed" corn to the snapping rolls.

Another object of the invention resides in a novel drive coupling for the system of transfer chains which permits continuous operating without interfering with pivotal movement of the gathering head.

A still further object is to provide a simple, inexpensive and efficient corn gathering attachment easily adapted for use with existing harvesting equipment without requiring extensive modification.

Additional objects and the entire scope of applicability of the present invention will become apparent from the detailed description given hereinafter. It should be understood, however, that the detailed description and specific examples, while indicating the preferred embodiments of the invention, are given by way of illustration only, since various changes and modifications within the spirit and scope of the invention will become apparent as the description herein progresses. Reference is made to the accompanying drawings, in which the same reference numerals refer to similar components and wherein:

FIGURE 5 is an enlarged diagrammatic view in side elevation of another detail of the invention;

FIGURE 6 is a view in perspective of the detail shown in FIGURE 5 with parts removed; and FIGURE 7 is a perspective view of a modified form of the invention.

Figure 1:
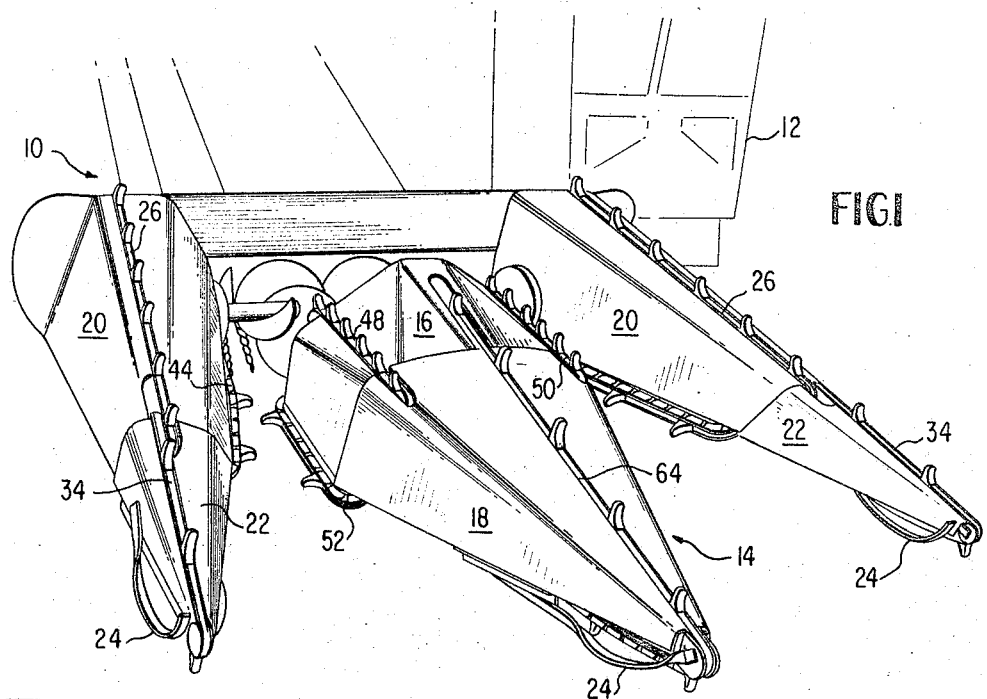
FIGURE 1 is a view in perspective of the front of a corn harvesting unit modified to include the improvements of this invention.

Briefly stated, this invention contemplates an improved chain conveying system by which "downed" corn can be raised and fed to a harvesting unit. The system includes a novel drive coupling which permits continuous operation of the conveying chains during pivotal movement of the gathering head in accommodating the irregular contours encountered when moving through any field. As shown in the drawings, the corn head includes an elongated centrally disposed divider flanked by a pair of side dividers. In turn, each of the dividers is provided with a relatively fixed rear body portion and a forward snout portion pivotally mounted thereon for vertical oscillation. The dividers and their associated snouts are adapted to be disposed in a straddling relationship with respect to the rows of corn being harvested from the field. It should be understood, however, that the modifications forming the subject matter of this invention could be utilized with equal facility on a single row corn picker or on a corn harvester capable of handling two or more rows. As previously stated, the purpose of the improved corn gathering head is to raise corn from the "downed" position as the unit passes through the field. To this end, each of the dividers and associated snouts is equipped with an appropriate system of chains extending rearwardly from the respective forwardmost portions which are extended to assist in raising the "downed" corn and thereafter to convey the same in substantially vertical disposition to the snapping rolls of the harvester. Because of the pivotal drive coupling, the snout portions are free to move up and down in accommodating irregularities in the field surface without affecting the driving relationship of the chain systems.

Figure 2:
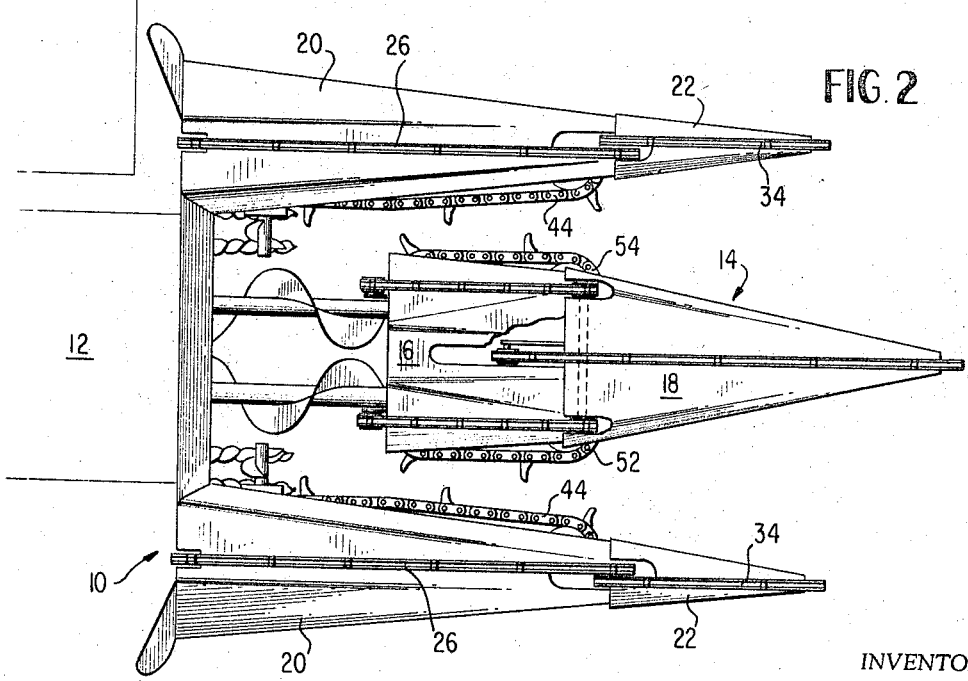
FIGURE 2 is a top view of the unit shown in FIGURE 1 with parts broken away.

Referring now more particularly to FIGURES 1 and 2 of the drawings, a corn head modified in accordance with the present invention is generally designated by the numeral 10 and is disposed on the forward end of a conventional combine harvester 12 which has been illustrated in phantom. As shown, the corn head 10 includes a centrally disposed divider 14 provided with a body portion 16 secured to the mounting frame of the corn head, by means not shown, and a forwardly extending snout portion 18 pivotally mounted thereon for vertical oscillation. Each of the side dividers which flank the central divider includes similarly fixed body portions 20 and forwardly extending snout portions 22 pivotally mounted thereon for vertical oscillation. All of the dividers are characterized by tapered body sections which terminate at their forwardmost extremities in the form of movable snout members adapted to contact the ground on adjustable skid shoes 24 affixed to the under side of each snout.

As hereinbefore set forth, the corn head attachment 10 is supported by a suitable frame structure, the details of which have been omitted, but upon which each of the side and center divider units are rigidly mounted. In turn, the supporting frame of the corn head attachment is pivotally mounted on the forward portion of the combine harvester in a conventional manner. Suitable hydraulic elevating means are provided whereby the entire corn head unit 10 may be elevated or lowered to vary its attitude and angular disposition with respect to the ground surface.

Each of the side dividers is equipped with a transfer chain 26 entrained about a suitable drive sprocket 28 and a pair of idler sprockets 30 and 32, as seen in FIGURES 5 and 6 of the drawings. In turn, drive sprocket 28 is connected to a suitable power take-off coupling of the combine. It is to be noted that the relative distance between drive sprocket 28 and idler sprockets 30 and 32, around which transfer chain 26 is entrained, remains unchanged as the corn head is raised or lowered. In this regard, each of the pivotally mounted side snout portions is equipped with an appropriate transfer chain entrained on sprockets 36 and 38, and 40. The sprocket 36 is splined on a common rotatable shaft 42 with sprocket 32 of the transfer chain 26. Sprocket 32 also is splined to shaft 42. In this manner the driving inter-relationship between transfer chains 26 and 34 is achieved simultaneously.

As shown in phantom outline in FIGURE 5, transfer chains 34 carried by side snout portion 22 are capable of pivotal displacement as the skid shoe 24 glides over any ground surface irregularities. Uninterrupted drive of transfer chain 34 is accomplished regardless of the disposition of the snout relative to the body portion of the divider due to the unique mounting of the snout for rotation about a pivot point common to the axis of rotation of sprocket 36. Thus, it may be seen that as skid shoe 24 encounters any ground surface irregularity the snout is allowed to rotate about its pivot point, yet the relationship between sprockets 36, 38 and 40 remains unchanged. Since the distance between sprockets 36, 38 and 40 is fixed and does not vary, pivotal movement of the snout portion may be accomplished without incurring any slack in transfer chain 34. It is also important to recognize that transfer chains 34 extend to the forwardmost extremity of the snout portion itself, and as such are capable of engaging and lifting the "downed" corn stalks immediately upon contact as will be more fully discussed hereinafter. Obviously, either or both of the side dividers may be equipped with similar chain systems although in the interest of brevity it is believed that the description of one such unit is sufficient for a complete understanding of the overall operation.

Center divider unit 14, which is disposed between the two side divider units 20, is provided with a fixed body portion 16 that is carried by the supporting frame of the corn head and a pivotally mounted forward snout member 18. A pair of upper transfer chains 48 and 50 are mounted to the right and left of center, respectively, on the fixed body portion 16 of the center divider 14. Each of the transfer chains 48 and 50 is entrained about a suitable drive sprocket 56 and idler sprockets 54. Drive sprockets 56 in turn are rotatably supported on opposite ends of a drive shaft 58 which is journalled to the respective interior central frame members 60 and 62.

A forward transfer chain 64 is carried by the snout portion 18 of the center divider and extends from a point rearwardly of the snout body to the forwardmost extremity of the snout. The forward transfer chain 64 is entrained about sprockets 66 and 68 and is driven by sprocket 70. Drive sprocket 70 is keyed to drive shaft 72 which is in turn journalled at its opposite ends to divider frame member 74. It is to be noted that a prolongation of the axis of rotation of shaft 72 also constitutes the pivotal axis of the snout portion 18 relative to the body portion 16 of the center divider 14. Thus, shaft 72 serves the further purpose of acting as a distribution drive shaft for transfer chains 48, 50 and 64 which are disposed on the body 16 and snout 18 of the center divider. In this regard, a drive sprocket 76 interconnects shaft 72 with shaft 58 by means of chain 78 and sprocket 80. The driving power for the entire chain system is derived from the previously described main power take-off connection of the combine harvester through a suitable drive coupling as diagrammatically shown in the illustrative example where chain 82 and fragmentary power supply shaft 84 are shown.

Turning now to the structural details of the central divider, a pair of snout supporting arms 86 extend angularly outwardly from the center snout pivot point 88 converging at the leading end of snout 18 at which point they provide suitable support means for the sprocket 68 over which the transfer chain 64 is entrained. The adjustable skid shoes 24 are mounted on the under side of each of the arms 86 adjacent their forward ends, and suitable adjusting brackets 90 are disposed on the trailing end of the skid. Both the brackets and the skid shoes are provided with a plurality of aligned openings through which a bolt or other fastening means may be selectively introduced to obtain the desired degree of arc in the skid shoe, thus achieving proper elevation of the snout to prevent the chain from contacting the ground but providing sufficient clearance to enable the chain to pass in close proximity to the "downed" stalks which would otherwise pass therebeneath.

Transfer chain 64 positioned in snout portion 18 of the center divider and transfer chains 26 disposed in the body portions of the side dividers are supported in recessed guide blocks or trackways 92. By spacing the blocks to provide openings 94 therebetween, it is possible to prevent dirt and other material normally entrapped by the chains from accumulating under the chains, thus placing them under increased tension as harvesting continues. Such increased tension would, of course, eventualy result in chain failure. By spacing the blocks constituting the bases of the trackways 92 to provide openings 94 therebetween any foreign material inadvertently carried by the chains into the trackways may be freely discharged through the openings 94, thus preventing such undesired accumulation.

As hereinbefore discussed in connection with the snout portions of the side dividers, transfer chain 64 extends all the way to the extreme forward portion of the divider body for contacting the "downed" corn stalks when the snout portion is brought into proximity of the ground. Heretofore, conventional corn pickers have not contained any transfer chains carried by the movable snout portion of the dividers, relying instead on the impaling movement of the snout to raise the corn stalks before encountering the lower snap roll conveying chains 44, 52, and 54 disposed rearwardly of the snout along the lower portion of the divider body. In fields where the corn has been broken and entangled in close proximity to the ground, a substantial portion of the "downed" crop would pass under the forward snout portions of the picker head, resulting in a considerable wastage and crop loss. In the instant invention, however, stalks which would otherwise tend to pass under the respective snouts are seized by the transfer chains and carried to the upper side of the snout bodies.

The speeds at which the various transfer chains may be driven are a variable function of the conditions under which the machine is adapted to operate, the chain speed variations may be achieved by merely substituting sprockets of varying sizes to accomplish the desired result. Experimentation has shown that best results are achieved when the transfer chain speed is at least equal to the forward velocity of the combine harvester although transfer chain speeds of one and one-half times ground speed have provided entirely satisfactory results.

It should be understood that the previously described transfer chains are not to be confused with the conventional gathering chains or chains generally designated by the numerals 44, 52 and 54. Such gathering chains are normally disposed rearwardly of the snout and adjacent the bottom of the divider body in substantially horizontal relationship and as such form no part of the instant invention since they are principally designated to encounter standing corn. As will be readily recognized, such gathering chains merely serve to introduce the stalks to the snapping rolls after they have been impaled on the snout and do not assist in elevating the corn. In contradistinction, the transfer chain system disclosed herein for adaptation to the center and side divider elements not only serve to initially elevate the corn stalks to a substantially standing position, but thereafter facilitate rapid and aggressive conveying of the same away from the snouts of the picker head in order to eliminate plugging and clogging of the snout area.

Figure 3:
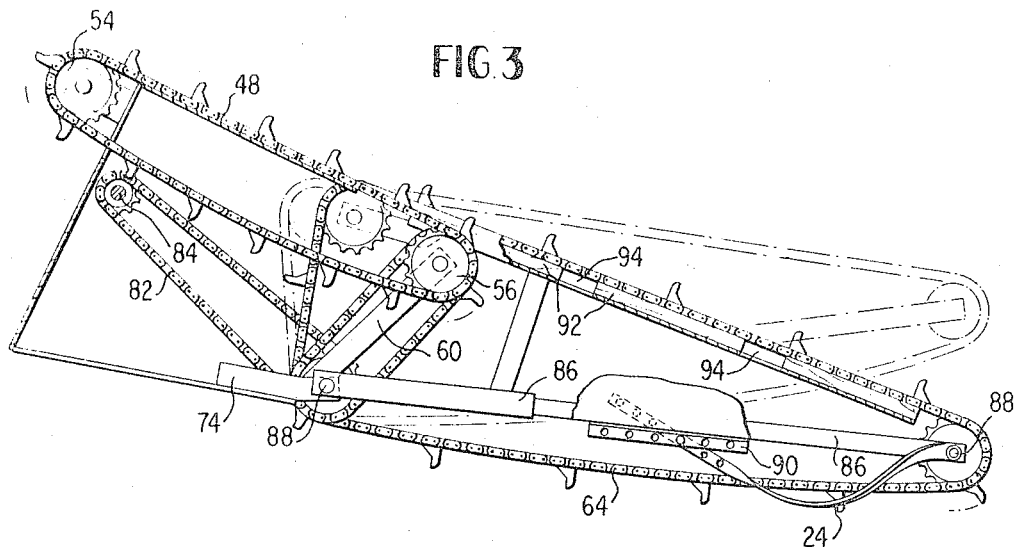
FIGURE 3 is an enlarged diagrammatic view in side elevation of a detail of the invention.
Figure 4:
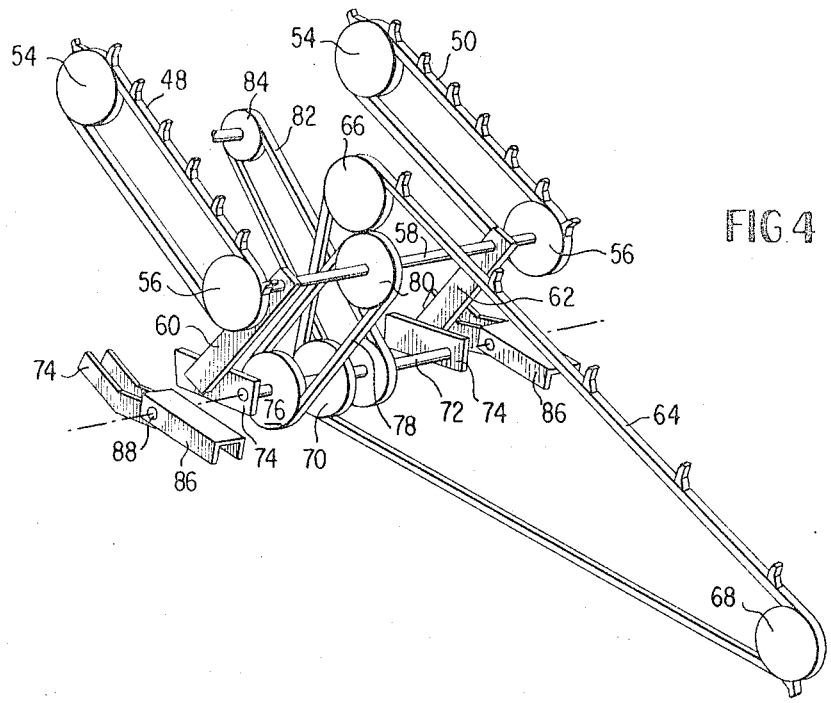
FIGURE 4 is a perspective view of the detail shown in FIGURE 3 with parts removed.

A modified form of the inventive concept herein disclosed is shown in FIGURE 7 in which a corn head is depicted as having elongated side divider snout elements 98 and 100 and a center divider snout 102. In this modified form, each divider snout is pivotally mounted directly to the supporting frame of the head. However, a similar purpose is accomplished by providing each of the side dividers with a pair of transfer chains, one of which extends along the entire upper surface of the divider while the other moves upwardly in a helical path from the forwardmost extremity. Pivotal mounting of the divider is accomplished in somewhat the same manner as that shown in FIGURE 3; in which the pivotal axis for the divider body coincides with the axis of rotation of the drive sprocket 108, which common axis is located on the extremity of a suitable supporting frame member (not shown) extending from the harvester body. A drive sprocket 105 is provided adjacent the bottom of the divider to drive the chain 104 and insure its continued disposition in close proximity to the ground. The second transfer chain is driven by a sprocket 110 splined to rotatable shaft 106 and is mounted around the sprocket 112 in such a manner as to be horizontally disposed at its forwardmost portion and vertically disposed at its point of entrainment with the rear sprocket 110. Intermediate sprocket 112 and the rear drive sprocket 110, the transfer chain assumes a spiral disposition with respect to the divider body and extends rearwardly and upwardly in a sweeping arc from the sprocket 112 to the sprocket 110. Suitable track or guide means is provided in the divider body to accommodate the spiral path of the transfer chain which is constructed to flex or bend universally so as to maintain the usual protruding picking lugs (not shown) in outwardly facing relation for engagement with the stalks being conveyed to the harvester. Since movement of the side dividers which are pivotally mounted on the pivot point 105 will not interfere with the drive connection for sprockets 108 and 110 conveying power to the transfer chains, the snouts are free to be vertically displaced without affecting the driving relationship of the transfer chains.

With regard to the center divider, a similar pair of universally flexible transfer chains are mounted for sweeping helical movement up opposite sides of the divider body as diagrammatically shown at 114 and 116. Sprockets 118 and 120 drive the side and center transfer chains respectively. The sprockets 118, 120 are all splined on a rotatable shaft whose axis of rotation is common with the pivotal axis of the divider body.

Thus, it will be recognized that the various divider units of the modified form are capable of moving in close proximity to the ground, while at the same time providing both vertical and horizontal conveying components which have the effect of elevating the corn stalks to a vertical position prior to the corn being stripped from the stalk.

Operation

As hereinbefore set forth, the operation of this improved gathering attachment is contemplated as being adapted for use with a combine harvester where the unit is driven between rows of corn with one row being straddled by one of the side dividers and the center divider while an adjacent row is disposed in similar relation between the other side divider and the opposite side of the center divider.

The angular relationship of the corn head relative to the ground is such that the skid shoes 24 carried by the respective snouts of the dividers will advance in contact with the ground surface, moving vertically to accommodate any irregularities. The various transfer chains are driven from the power take-off mounted on the combine itself at any desired rate of speed but preferably greater than the ground speed maintained during forward movement of the vehicle. As the snouts engage the "downed" corn, the chains will initially seize the stalks and lift them upwardly along the snout surfaces and thereafter convey the stalks rearwardly. As the stalks which are disposed on the tapering bodies of the dividers are conveyed rearwardly by the transfer chains, they are simultaneously elevated to a substantially standing position before being seized by the gathering chains 44, 52 and 54 and conveyed to the snapping rolls (not shown).

Flexure of the various snouts is essential to accommodate any irregularities in the ground surface. However, such movement has no effect on the continued driving of the transfer chains mounted in the respective snout portions, because the snout portions and related snout transfer chain drive sprockets are mounted along a common axis of rotation. Thus, as the snouts oscillate about their respective pivots carrying with them the pulley over which the transfer chains are entrained, the special relationship between the pulleys and drive sprockets is maintained, thus precluding any slacking of the chain.

Broad aspects

In its broad aspects, the corn head of the present invention is a frame having laterally spaced row divider units each including a body consisting of one or more portions arranged for vertical oscillation on a horizontal pivot axis. One or more of the unit body portions carries wholly thereon an endless chain conveyor trained over a driving sprocket that rotates on the pivot axis of the body portion.

The row dividers are equipped with conventional gathering chains and carry stalk engageable conveyors that operate ahead of the gathering chains to pick up stalks of down corn and force them into standing position, in which position they are transferred by the conveyors into the gathering chains.

A principal feature common to all forms of the invention is the common axis location of the pivot for the vertical oscillation of the pivoted divider portions and the operating sprockets of their conveyor chains. Also of primary importance is the fact that in each of the embodiments of the invention herein shown the divider unit members that oscillate are pivoted on an element of the corn head frame. In the FIGURE 7 arrangement the dividers are pivoted on the frame extension rails. In the FIGURE 1 arrangement the snouts are pivoted on the fixed body portions of the divider units which are rigid extensions of the corn head frame.

The respective proximate end portions of the divider and snout conveyor top flights are disposed side by side in transfer relation, and the snout conveyor is driven by the divider conveyor through an operating connection located on the pivot axis of the snout; thus constituting means enabling angular displacement of the snout conveyor relative to the divider conveyor without alteration of any component in either, regardless of the extent of oscillation of the snout incident to ground surface configuration.

It is to be understood that although several preferred embodiments of the invention have been shown in the drawings and described with considerable particularity in the foregoing specification, the invention is not limited to the specific details of construction shown and described, but includes all modifications coming within the scope of the appended claims and their equivalents.

I claim:

1. In a corn harvester, the combination comprising: a corn head, first and second side dividers mounted on said head, each of said dividers characterized by a forwardly extending tapering body portion terminating in a pivotally mounted vertically displaceable snout portion, a first transfer chain mounted on said body portion of each of said dividers and a second transfer chain mounted on said snout portion of said divider for pivotal movement therewith, said first and second chains driven by a common power source, a center divider disposed between said side dividers on said corn head and likewise characterized by a long tapering body portion terminating in a pivotally mounted vertically displaceable snout portion, said body portion of said center divider including a pair of transfer chains mounted for exposure through the upper surface thereof and disposed on opposite sides of the longitudinal center line of said body portion, a transfer chain mounted on said pivotally mounted snout portion of said center divider for vertical movement therewith, and pivot means for each of said snouts on said side dividers and said center divider having a common axis of rotation with the axis of rotation of the drive means for the transfer chains mounted on each of said snouts.

2. In a corn head having laterally spaced row dividers provided individually with guide snouts pivoted about a horizontal axis thereon for vertical oscillation; a stalk conveyor on the top face of at least one divider, a pick-up conveyor carried wholly by the guide snout of that divider separate from the divider conveyor and in transfer relation thereto, means for operating the divider conveyor, and an operating connection between said conveyors located on the pitvot axis of the snout.

3. In a corn head having laterally spaced row dividers at least one of which carries a guide snout pivoted thereon about a horizontal axis for vertical oscillation; an endless chain stalk conveyor wholly on the divider, an endless chain stalk conveyor wholly on the snout and in transfer relation to the divider conveyor, means for driving the divider conveyor, a sprocket in the divider conveyor and driven thereby, a sprocket in the guide conveyor for operation thereof, both said sprockets being rotatable on the pivot axis of the guide snout, and an operating connection between said sprockets effecting their rotation in unison.

4. In a corn head having row divider members carrying at their outer ends individual guide snouts pivoted thereon to oscillate on a horizontal axis; an endless chain conveyor carried wholly by at least one of said snouts and trained over a sprocket rotatable on a horizontal axis coinciding with the pivot axis of the snout, said chain having an upper flight extending longitudinally along the upper face of the snout and a lower flight extending longitudinally along the bottom of the snout, the chain passing over an idler outwardly over the forward extremity of the snout, exterior lugs on the chain, and means for operating said sprocket to move the lower flight of the conveyor forwardly and its upper flight rearwardly.

5. In a corn head having row divider members carrying at their outer ends individual guide snouts pivoted thereon to oscillate vertically on a horizontal axis; an endless chain conveyor carried wholly by at least one of said members and having an upper flight extending longitudinally along the upper face of the member from its front end inwardly and trained over a sprocket at the front end of the member, an endless chain conveyor carried wholly by the guide snout of said member and trained over a sprocket rotatable on the horizontal pivot axis of the snout, said snout conveyor trained over an idler advanced outwardly of the forward extremity of the snout, said snout conveyor having an upper flight extending longiutdinally along the upper face of the snout and a lower flight extending longtudinally along the bottom of the snout, the rear end portion of the snout conveyor and the front end portion of the divider member conveyor being in transfer relationship, exterior lugs on both conveyor chains, an operating connection between said conveyor sprockets, and means operative to drive the conveyors with their upper flights travelling rearwardly in unison.

6. A corn head row divider comprising a body portion having a snout portion pivoted on the forward end thereof for vertical oscillation on a horizontal axis, an endless chain conveyor on and individual to each portion of the divider, said conveyors having proximate end portions in laterally spaced transfer relationship, said conveyor chains each trained over a sprocket individual thereto and rotatable on the pivot axis of the snout portion, and a driving connection between said sprockets.

7. In a corn head having laterally spaced row dividers provided with individual articulated guide snouts; a stalk conveyor operative longitudinally at and along the top face of at least one divider, a pick-up conveyor carried wholly by the guide snout of that divider and operative longitudinally at and along the top face of the snout, the proximate end portions of both conveyors being in transfer relation, means for operating the divider conveyor, and a driving connection between the conveyors effecting their operation in unison, said driving connection between the conveyors including means enabling angular displacement of the snout conveyor relative to the divider conveyor while both are in operation.

8. A corn head comprising: a frame having laterally spaced row divider units pivoted on an element of the frame for vertical oscillation thereon, at least one of said units carrying wholly thereon an endless chain conveyor having an upper flight disposed on the upper face of the unit, and said chain being trained over a driving sprocket mounted on an axis of rotation coincident with the pivot axis of the unit, said unit carrying the conveyor having wholly thereon an additional endless chain conveyor with a flight passing longitudinally along a side face of the unit in substantially a spiral path from the bottom front end portion of the unit to its upper rear end alongside the first name conveyor, and a driving connection between the conveyors for effecting their operation in unison.

9. In a corn head having laterally spaced row dividers provded individually with guide snouts located forwardly on the dividers, a conveyor means on at least one divider for conveying crop to snapping rolls, an endless pick-up conveyor means on the guide snout of the said one divider, said endless pick-up conveyor means projecting exteriorly from the said snout and extending longitudinally along the bottom of the snout to the forward extremity of the snout contactable with the ground and then rearwardly along the upper face of the snout, means pivotally mounting the said guide snout on the said one divider for vertical oscillation about a horizontal axis, means for driving said endless pick-up conveyor means, said last recited means including an endless drive member and a rotatable drive member mounted for rotation about said horizontal axis, said endless drive member being trained about said rotatable drive member.

References Cited

UNITED STATES PATENTS

| | | | |
|---|---|---|---|
| 519,929 | 5/1894 | Schurkens | 56—106 |
| 821,635 | 5/1906 | Hamachek | 56—312 |
| 953,265 | 3/1910 | Ginaca | 56—99 |
| 1,392,258 | 9/1921 | Mayer | 56—17 |
| 1,663,843 | 3/1928 | Hyman | 56—119 |
| 3,031,832 | 5/1962 | Seifried | 56—111 |
| 3,067,562 | 12/1962 | Ashton et al. | 56—106 |

ABRAHAM G. STONE, *Primary Examiner.*

ANTONIO F. GUIDA, P. A. RAZZANO,
*Assistant Examiners.*